No. 693,628. Patented Feb. 18, 1902.
P. E. SHAW.
MEASURING INSTRUMENT.
(Application filed Dec. 2, 1901.)
(No Model.)

Witnesses:
H. H. Robbins
E. K. Lundy

Inventor:
Philip E. Shaw
by Weller Bell
his atty

UNITED STATES PATENT OFFICE.

PHILIP EGERTON SHAW, OF NOTTINGHAM, ENGLAND.

MEASURING INSTRUMENT.

SPECIFICATION forming part of Letters Patent No. 693,628, dated February 18, 1902.

Application filed December 2, 1901. Serial No. 84,472. (No model.)

*To all whom it may concern:*

Be it known that I, PHILIP EGERTON SHAW, a subject of the King of Great Britain, residing at No. 2 Russel Place, Lower Talbot street, in the city and county of Nottingham, England, have invented a new and useful Measuring Instrument, of which the following is a specification.

The object of this invention is the construction of an instrument capable of measuring distances which are too small to be measured by the sense of touch or sight, and such instrument may be used for measuring the distance between two surfaces, for fixing a surface or point from another fixed surface or point, for measuring changes in the dimensions of a body due to changes in temperature or other causes, and for making other small measurements.

Figure 1:
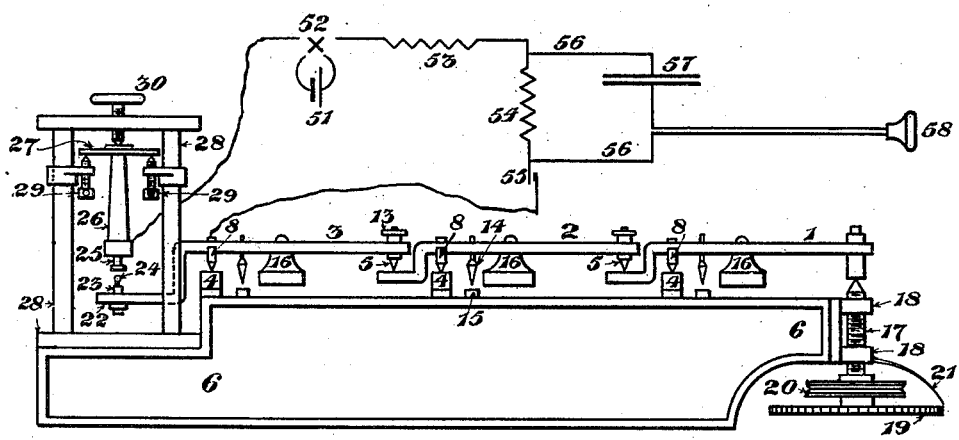
Figure 2:
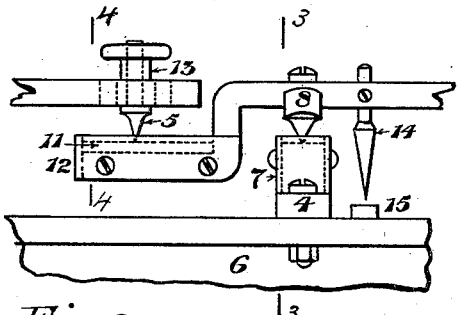
Figures 3, 4:
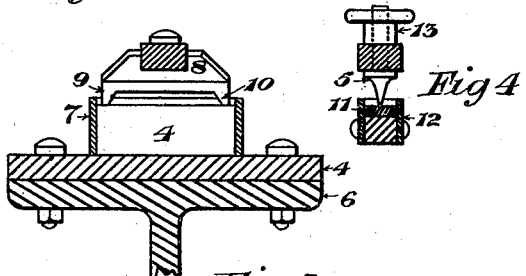
Figures 5, 6:
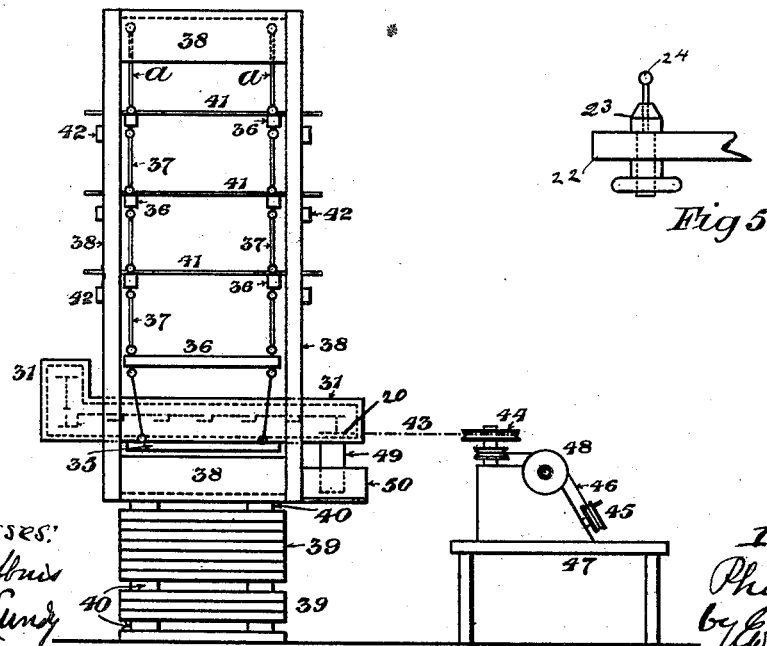

In the drawings which accompany this specification, Figure 1 is a side elevation of an instrument with three levers. Fig. 2 is an elevation to an enlarged scale, showing details of the levers. Fig. 3 is a section on the line 3 3, Fig. 2. Fig. 4 is a section on the line 4 4, Fig. 2. Fig. 5 is an elevation showing details of the construction of the movable measuring-point, and Fig. 6 is an elevation showing the method of suspending the instrument and of working the same.

The instrument illustrated in the drawings comprises a number of unequal-armed levers 1, 2, and 3, which are fitted to turn on fulcra-blocks 4 and so arranged that the long arm of each of the levers 2 and 3 is actuated by the short arm of the preceding lever through pointed pins 5, the top of the fulcra-blocks 4 and the contact-points between the levers being arranged in the same plane, so that the movement of the levers at the contact-points is normal to that plane. The levers may be of steel, brass, or other suitable material, but the last lever of the system should be of a non-magnetic material. The fulcra-blocks, which are of hardened steel and have a perfectly true surface, are firmly attached to the base or girder 6, and each block is surrounded by a metal casing 7, Fig. 3, which projects above the surface of the block and forms a bath for oil, by which friction is reduced, and the block and knife-edges of the lever are protected from atmospheric influences. Each lever is fitted with a steel block 8, which is of considerable width compared with the levers and is shaped to form two small "knife-edges" 9 and 10, upon which the lever rests, the distance between such knife-edges insuring a steadier action of the lever. The knife-edges may be of agate or other suitable material. The short end of each of the levers is fitted with a hardened-steel plate 11, Fig. 2, or the levers may be of steel with hardened ends, and these ends are fitted with a metal casing 12, which forms the sides of a bath for oil, in which the pin 5 of the adjacent lever works. The pin 5 on the long end of each of the levers except the first is fixed thereto by a nut 13, and there are two or more holes in the lever, so that the position of the pin can be changed to vary the leverage. The levers are also fitted with pins or pointers 14, and the beam has index-plates 15, by which the relative position of the levers can be fixed, or a loose templet may be used for the same purpose. Each lever is also provided with a weight 16 to insure contact between the levers and to assist in maintaining the steadiness of the system of levers. The end of the long arm of the first lever of the series rests upon the end of a very fine-threaded screw 17, which can turn in a nut 18, attached to the beam 6. The lower end of the screw 17 is fitted with a divided or graduated wheel 19 and a cord-pulley 20, and there is also a fixed pointer or index-finger 21, by or through which the angular movement of the screw, and consequently the movement given to the end of the first lever, can be ascertained. The end 22 of the lever 3 is fitted with a pin 23, which carries a spherically-ended pin 24, of iridio-platinum or other material capable of conducting an electric current and sufficiently hard to take a very high polish, but upon which the atmosphere has little effect. The fixed measuring point or surface 25, which has similar properties to the movable measuring-point, is carried by a spindle 26 from a plate 27 and can be adjusted in the frame 28 by the adjusting-screws 29, there being used by preference, and the binding-screw 30, the frame 28, and its attached parts being firmly attached to the beam 6.

The instrument herein described is inclosed in a felt-covered case or box 31 to protect it from effects of changes of temperature, drafts, and other disturbing influences, and this box is attached to the base-board 35 of a suspended frame, which is constructed of cross-bars 36, with rubber connections 37 between the cross-bars. This instrument-frame is suspended by rubbers $a$ from a rigid frame 38, which may be square or other convenient shape, is weighted, if necessary, and rests upon a pillar or support made up of heavy slabs 39 with rubber cushions 40 at intervals, by which arrangement the effects upon the instrument of external vibrations transmitted through the earth are reduced to a minimum. The instrument-frame may, however, be supported from any other fixed support, and the tension of the rubber connections of the frame may be adjusted by weights 41 on the cross-bars 36, and there are rails 42 to limit the movement of such weights.

The screw 17 is actuated by a light elastic cord 43, which passes around the pulley 20 from a pulley 44, which is driven from a hand-wheel 45 through a cord 46 and suitable guide-pulleys 48, the whole of this driving mechanism being carried by a fixed independent stand 47, and to minimize any disturbing effect that might be transmitted to the instrument by these driving means the under side of the instrument-box 31 or the base 35, carrying it, is provided with a cylindrical or other shaped body of comparatively large surface, which projects into a tank 50, containing castor-oil or other similar viscous fluid. The vertical movement of the screw 17 actuates the system of levers, the extent of the movement of the screw being reduced by each lever, and when the point 24 touches the fixed surface 25 an electric circuit is completed and the contact of the points is indicated by any suitable electrical instrument. In the arrangement shown the circuit comprises the end 22 of the last lever and its measuring-point, the fixed measuring-point 25, a cell 51, reversing-key 52, a small resistance 53, a large resistance 54, key 55, and a shunt 56, containing a condenser 57, and a telephone-receiver 58, by which the "make" and "break" between the points 24 and 25 are indicated to the operator.

The instrument may be calibrated by calculating the combined mechanical advantage of the lever system and the pitch of the screw 17, and from these calculations a unit of movement of the pin 24 is obtained for each division of the wheel 19. The calibration may, however, be effected with greater accuracy by optical methods based upon the known wave length of light, such as the movements of a system of Newton's rings formed between a fixed glass surface and a movable glass surface carried by the last lever of the series, and from such movements the unit of movement of the end of the lever 3 is obtained for each division of the wheel 19.

Before measurements are taken the measuring-surface 25 is adjusted relatively to the point 24 by the screws 29 and 30 until the extreme strain that can be set up in the upper part of the frame 28 by the screw 30 will just produce electrical contact between the points 24 and 25. The whole apparatus should be placed in a position free from the effects of external vibrations, such as are produced by a moving vehicle, moving machinery in adjacent buildings, and other similar causes, and should be in a room where a constant temperature can be maintained, freedom from drafts insured, and where other precautions can be taken such as are usual and necessary for the operating of delicate instruments.

When it is desired to measure the distance between two surfaces, such as the thickness of a thin metal plate, the instrument is carefully adjusted and the measuring-surfaces highly polished and kept in that condition by frequent polishings to insure a sharp sound on the telephone at each make and break. Contact is then made between the measuring-surfaces by actuating the screw 17, and the number of the division on the wheel 19 is noted. The plate to be measured is also highly polished, and after the movable measuring-point has been separated from the fixed point the plate to be measured is placed between the points. The movable point is then moved by the screw 17 until electrical contact is made through the plate and the reading of the wheel 19 is again noted, and from the difference of the two readings the thickness of the plate is ascertained. For measuring the thickness of a piece of non-conducting material it is placed between metal plates of known thickness, which are electrically connected to each other. The measuring-points can be set at a desired distance from each other by reading the wheel 19 when the points are in contact and calculating the number of divisions of the wheel required for the desired distance between the points and then turning the wheel through such number of divisions. The instrument may also be used for measuring the expansion or contraction of a body by changes of temperature or other causes and for making other small measurements of a similar character or for indicating when changes occur in the character of the surfaces of the measuring-points or their equivalents.

The measurements herein referred to are extremely small, and great precautions are required to insure that the instrument shall not be affected by vibrations, changes of temperature, drafts, or other disturbing influences.

In modifications the levers may be arranged one above the other or in other different positions relatively to each other. The number of levers and their leverage may be varied, and instead of the knife-edges other forms of fulcra or pivots may be used. The frame for carrying the fixed measuring-point may be varied according to requirements, and the reading of the index-wheel of the screw may be taken by telescope or other optical instrument. In another modification designed for effecting comparatively rough measurements the lever system may be dispensed with and the screw with its divided wheel may be fixed on a line with a fixed measuring-point, so that the measurements can be made between the end of the screw and the fixed measuring-point, such measurements being indicated by electrical contact, as already described.

What I claim, and desire to secure by Letters Patent in the United States, is—

1. In a measuring instrument the combination of a fine-threaded screw with a series of levers actuated by the screw, a movable measuring-point carried by the last of the series of levers, a fixed measuring-point, an electric circuit the terminals of which are respectively connected with said measuring-points, and an indicator for indicating the making and breaking of the circuit, substantially as herein set forth.

2. In a measuring instrument, the combination with a series of levers each pivotally mounted on a knife-edge bearing, the movement of one of said levers being communicated to the others, of a finely-threaded screw having fixed thereon a graduated wheel, the said screw being arranged to shift the position of the first lever and through the latter the other levers, a movable measuring-point carried by the free end of the last lever of the series, a stationary measuring-point arranged opposite the movable measuring-point, means for adjusting the stationary point relatively to the movable point, an electric circuit the terminals of which are connected to the respective measuring-points, and an indicator included in said circuit for indicating the make and break of the circuit caused by bringing together and separating the said measuring-points, substantially as described.

3. In a measuring instrument, the combination with a series of levers each having fixed thereon a block provided on its under side with two knife-edges, fulcrum-blocks on which the knife-edges rest, casings surrounding the upper edges of the fulcrum-blocks and forming oil-cups for oiling said blocks and knife-edges, the longer end of each lever resting on the shorter end of the preceding lever, a fine-threaded screw for moving the first lever on its fulcrum, a graduated wheel fixed on the screw, a movable measuring-point carried by the free end of the last lever, a frame arranged above the movable measuring-point, a stationary measuring-point mounted on said frame and opposite the movable measuring-point, adjusting-screws for adjusting the stationary measuring-point toward and from the movable measuring-point, an electric circuit the terminals of which are respectively connected to said measuring-points, and a telephone-receiver included in said circuit for giving audible notice when the measuring-points are brought together and separated, substantially as described.

4. In a measuring instrument, the combination with a series of levers so arranged that the movement of the first lever is transmitted throughout the series, of a fine-threaded screw for moving the first lever on its fulcrum, a graduated wheel fixed on said screw, a movable measuring-point carried by the free end of the last of the series, a stationary measuring-point arranged opposite the movable measuring-point, an electric circuit the terminals of which are formed by said measuring-points, a telephone-receiver included in said circuit, and a yieldingly-suspended frame for supporting the parts, substantially as described.

5. In a measuring instrument, the combination with a series of levers so arranged that the movement of the first lever is transmitted throughout the series, of a fine-threaded screw for moving the first lever on its fulcrum, a graduated wheel fixed on said screw, a movable measuring-point carried by the free end of the last of the series, a stationary measuring-point arranged opposite the movable measuring-point, a casing inclosing said parts, an electric circuit the terminals of which are formed by said measuring-points, a telephone-receiver included in said circuit, a yieldingly-suspended frame for supporting the instrument, means for turning the screw from without the inclosing casing, a fixed tank containing a viscous fluid arranged beneath one end of said casing, and a cylinder pendent from the corresponding end of the cylinder and partially immersed in said fluid, substantially as described.

6. In a measuring instrument, the combination with a series of levers so arranged that the movement of the first lever is transmitted throughout the series, of a fine-threaded screw for moving the first lever on its fulcrum, a graduated wheel fixed on said screw, pointers pendent from the levers, index-plates arranged beneath the pointers, a movable measuring-point carried by the free end of the last lever of the series, a stationary measuring-point arranged opposite the movable measuring-point, an electric circuit the terminals of which are formed by said measuring-points, a telephone-receiver included in said circuit, a box inclosing the instrument, a yieldingly-suspended frame supporting the box, and means for actuating the screw from the exterior of the box, substantially as described.

7. In a measuring instrument, the combination with a series of levers so arranged that the movement of the first lever is transmitted throughout the series, each of said levers being fulcrumed nearer one end than the other, cups containing oil on the shorter ends of the levers, pins carried by the longer ends of the levers, each pin resting on the bottom of the oil-cup carried by the preceding lever, a movable measuring-point carried by the free end of the last lever of the series, a stationary measuring-point arranged opposite the movable measuring-point, an electric circuit the terminals of which are formed by said measuring-points, a telephone-receiver included in said circuit, a box inclosing the instrument, a yieldingly-suspended frame supporting the box, and means for actuating the screw from the exterior of the box, substantially as described.

8. In a measuring instrument, the combination with a movable measuring-point, of a stationary measuring-point arranged opposite the movable measuring-point, a screw for moving the movable measuring-point, an indicator actuated by the movement of the screw for indicating the extent of movement of the movable measuring-point, an electric circuit the terminals of which are formed by the said measuring-points, and an electrical indicator included in said circuit for indicating when said measuring-points are brought into contact and separated, substantially as described.

In testimony whereof I have signed my name to this specification in the presence of two subscribing witnesses.

PHILIP EGERTON SHAW.

Witnesses:
WILLIAM H. POTTER,
JOHN ARCHER.